United States Patent
Thirion et al.

(10) Patent No.: US 12,243,357 B2
(45) Date of Patent: Mar. 4, 2025

(54) SYSTEM AND METHOD FOR REMOTELY UPDATING DATA FOR COMPUTER DEVICES INCLUDED IN AN AIRCRAFT

(71) Applicant: SAFRAN ELECTRONICS & DEFENSE, Paris (FR)

(72) Inventors: Louis Théophile Thirion, Paris (FR); Denis Delville, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 284 days.

(21) Appl. No.: 17/641,881

(22) PCT Filed: Sep. 25, 2020

(86) PCT No.: PCT/EP2020/076976
§ 371 (c)(1),
(2) Date: Mar. 10, 2022

(87) PCT Pub. No.: WO2021/063842
PCT Pub. Date: Apr. 8, 2021

(65) Prior Publication Data
US 2022/0327867 A1    Oct. 13, 2022

(30) Foreign Application Priority Data
Oct. 4, 2019   (FR) ...................... 1910998

(51) Int. Cl.
*G07C 5/00*     (2006.01)
*B64D 43/00*    (2006.01)
*G06F 8/65*     (2018.01)

(52) U.S. Cl.
CPC ............. *G07C 5/006* (2013.01); *B64D 43/00* (2013.01); *G06F 8/65* (2013.01)

(58) Field of Classification Search
CPC .......... G06F 8/65; G06F 21/572; G06F 8/656; G06F 9/44521; B64D 43/00; G07C 5/006; B64F 5/40
See application file for complete search history.

(56) References Cited

U.S. PATENT DOCUMENTS 5,828,969 A *  10/1998  Chamney .................. B64F 5/40
                                               702/35
9,911,247 B1 *  3/2018  Mishmash ........... G08G 5/0034
(Continued)

FOREIGN PATENT DOCUMENTS

| WO | 2014/172397 A1 | 10/2014 |
| WO | 2017/162526 A1 | 9/2017 |
| WO | 2019/175868 A1 | 9/2019 |

OTHER PUBLICATIONS

Dec. 22, 2020 International Search Report issued in International Patent Application No. PCT/EP2020/076976.
(Continued)

*Primary Examiner* — Thomas Ingram
*Assistant Examiner* — Faris Asim Shaikh
(74) *Attorney, Agent, or Firm* — Williams Mullen; R. Brian Drozd

(57) ABSTRACT

A system for updating data for computer devices included in an aircraft, the computer devices being, when the data is updated, liable to affect or not the safety of an operator performing maintenance, the system is included in the aircraft and includes a data loading device, a communication device, a data router and a module for detecting at least one maintenance operation on the aircraft. The system includes: means, included in the communication device, for receiving a command for updating a computer device; means, included in the communication device, for controlling the data loading device and the data router in order to transfer the updating data to the computer device; and means,
(Continued)

controlled by the module for detecting at least one maintenance operation on the aircraft, for blocking the updating if at least one signal indicating that a maintenance operation is being performed on the aircraft is received.

11 Claims, 7 Drawing Sheets

(56) References Cited

U.S. PATENT DOCUMENTS

| | | | | |
|---|---|---|---|---|
| 10,399,706 | B1* | 9/2019 | Hanlon | G07C 5/0841 |
| 2005/0027826 | A1* | 2/2005 | Loda | H04L 67/025 |
| | | | | 709/219 |
| 2009/0192659 | A1* | 7/2009 | Beebe | G07C 5/008 |
| | | | | 701/2 |
| 2013/0024727 | A1* | 1/2013 | Frayssignes | G06F 11/1004 |
| | | | | 714/E11.137 |
| 2013/0067450 | A1* | 3/2013 | Saugnac | H04L 67/12 |
| | | | | 717/170 |
| 2015/0066285 | A1* | 3/2015 | Albouy | G07C 5/006 |
| | | | | 701/29.3 |
| 2015/0134194 | A1* | 5/2015 | Beaujard | G07C 5/0808 |
| | | | | 701/31.7 |
| 2016/0026256 | A1* | 1/2016 | Massu | B64F 5/40 |
| | | | | 345/157 |
| 2018/0130030 | A1* | 5/2018 | Yang | B64F 5/40 |
| 2019/0109825 | A1 | 4/2019 | Verraes et al. | |
| 2020/0331620 | A1* | 10/2020 | Scheid | H04L 9/50 |
| 2022/0156056 | A1* | 5/2022 | Shimomura | G08G 1/16 |

OTHER PUBLICATIONS

Dec. 22, 2020 Written Opinion issued in International Patent Application No. PCT/EP2020/076976.

NN. "How To Keep Aircraft Maintenance Technicians Safe". Jan. 24, 2019, JETechnology, <URL: aircraftmaintenancestands.com/blog/how-to-keep-aircraft-maintenance-technicians-safe/> [retrieved on Jun. 3, 2020].

* cited by examiner

SYSTEM AND METHOD FOR REMOTELY UPDATING DATA FOR COMPUTER DEVICES INCLUDED IN AN AIRCRAFT

TECHNICAL FIELD

The present invention relates to a system and a method for remotely updating data for computer devices included in an aircraft.

PRIOR ART

Some computer devices, also referred to as computer apparatus, that equip aircraft must be updated regularly. This is for example the case with flight management systems (FMS) or flight data management systems (ACMS, standing for Aircraft Condition Monitoring Systems).

For other computer devices, the updating is not regular and is implemented only at isolated points in time.

Currently, updating data of a computer device included in an aircraft requires the presence in the cockpit of the aircraft of an operator who is controlling the updating of the computer device. This is because some computer devices are liable to affect the safety of an operator performing maintenance on the aircraft. For example, a computer device used for controlling movable members of the aircraft such as a rudder unit may, when it is updated, cause the movements of the rudder unit and injure a maintenance operator located in proximity to the rudder unit.

The operator in the cockpit must visually check that all the computer devices that are to be updated are in a state not presenting a risk for the maintenance operators, for example a possible movement of a movable element of the aircraft, before proceeding with the updating.

DISCLOSURE OF THE INVENTION

The present invention aims to increase the safety of the maintenance personnel by proposing a system and a method for updating data for computer devices included in an aircraft that guarantees that, during a maintenance operation being performed on an aircraft, no updating of data for computer devices included in the aircraft can be done.

This is particularly when the command to update data is generated outside the aircraft.

For this purpose, according to a first aspect, the invention proposes a data updating system for computer devices included in an aircraft, the computer devices being, when the data of the computer device are updated, liable or not to affect the safety of an operator carrying out maintenance, characterised in that the system is included in the aircraft and comprises a data loading device, a communication device, a data router and a module for detecting at least one maintenance operation on the aircraft, the data router being connected to the data loading device, the communication device being configured for receiving commands from a device located outside the aircraft, the system comprising:
  means, included in the communication device, for receiving a command for updating a computer device,
  means, included in the communication device, for controlling the data loading device for transferring data for updating the computer device to the data router if the command for updating the computer device is received,
  means, included in the communication device, for controlling the data router for transferring the updating data to the computer device if the command for updating the computer device is received,
  means, controlled by the module for detecting at least one maintenance operation on the aircraft, for blocking the data for updating the computer device or for blocking at least one command for transferring the updating data if at least one signal indicating that a maintenance operation is being performed on the aircraft is received by the module for detecting at least one maintenance operation.

The invention also relates to a method for updating data for computer devices included in an aircraft, the computer devices being, during the updating of the data of the computer device, liable or not to affect the safety of an operator performing maintenance, characterised in that the aircraft comprises a data loading device, a communication device, a data router and a module for detecting at least one maintenance operation on the aircraft, the data router being connected to the data loading device, the communication device being configured for receiving commands from a device located outside the aircraft, and in that the method comprises the steps of:
  receiving, by the communication device, a command for updating a computer device,
  controlling, by the communication device, the data loading device for transferring data for updating the computer device to the data router if the command for updating the computer device is received,
  controlling, by the communication device, the data router for transferring the updating data to the computer device if the command for updating the computer device is received,
  blocking, by the module for detecting at least one maintenance operation on the aircraft, the data for updating the computer device, or blocking at least one command for transferring the updating data if at least one signal indicating that a maintenance operation is being performed on the aircraft is received by the module for detecting at least one maintenance operation.

Thus the present invention increases the safety of the maintenance personnel by blocking any updating of data for computer devices included in the aircraft.

According to a particular embodiment of the invention, the module for detecting at least one maintenance operation on the aircraft is included in the communication device and the blocking means block the commands of the data loading device and the commands of the data router.

According to a particular embodiment of the invention, the module for detecting at least one maintenance operation on the aircraft is included in the data loading device and the blocking means block the transfer of the data for updating the computer device to the data router.

According to a particular embodiment of the invention, the module for detecting at least one maintenance operation on the aircraft is included in the data router and the blocking means block the transfer of the updating data to the computer device.

According to a particular embodiment of the invention, the module for detecting at least one maintenance operation on the aircraft is included between the communication device and the data router and the blocking means block the commands of the data router.

According to a particular embodiment of the invention, the system further comprises a device for detecting weight on at least one wheel of the aircraft (WoW, standing for "weight on wheels" i.e. the "on the ground" position of the aircraft) and the weight-detection device blocks the data for updating the computer device or blocks at least one command for transferring the updating data.

According to a particular embodiment of the invention, the module for detecting at least one maintenance operation on the aircraft comprises means for detecting a command generated by a maintenance operator.

According to a particular embodiment of the invention, the module for detecting at least one maintenance operation on the aircraft comprises means for detecting a condition that the aircraft is not in a maintenance phase, and that the updating operation is not enabled.

According to a particular embodiment of the invention, the data loading device is connected to the data router by two links, one link for transferring data and one link for transferring information for configuring the data router.

According to a particular embodiment of the invention, the updating data are received by means of a link with a data device for transferring updating data located outside the aircraft.

The invention also relates to the computer programs stored on an information carrier, said programs comprising instructions for implementing the previously described methods, when they are loaded into and executed by a computer system.

BRIEF DESCRIPTION OF THE DRAWINGS

The features of the invention mentioned above, as well as others, will emerge more clearly from the reading of the following description of an example embodiment, said description being made in relation to the accompanying drawings, among which:

In FIG. 1a, an aircraft 10 comprises a data updating system for computer devices $140_1$ to $140_N$ included in the aircraft 10.

Figure 1A:
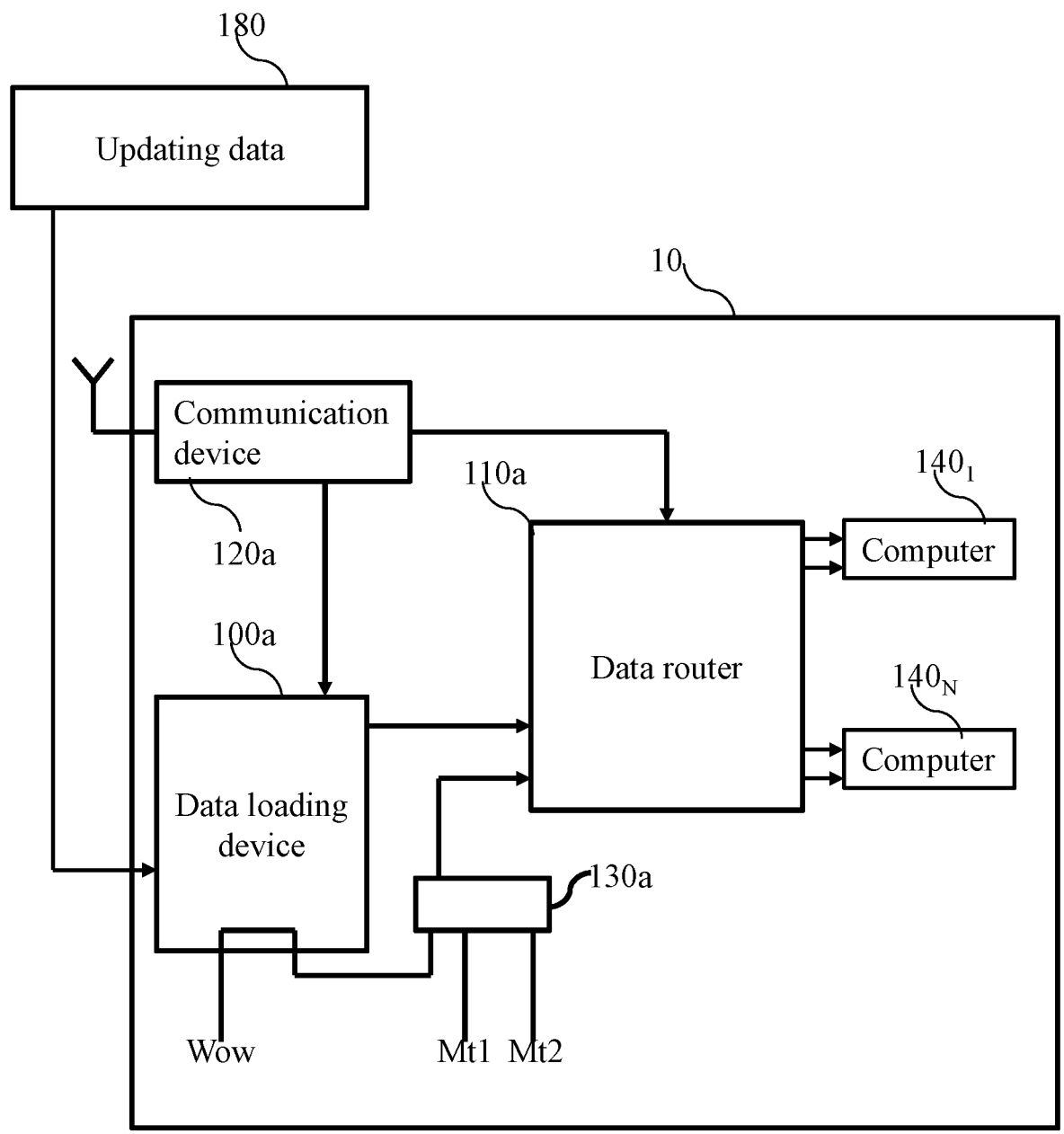
FIG. 1a shows a first example of architecture of the data updating system for computer devices included in an aircraft.

The data updating system comprises a data loading device 100a, a data router 110a, a communication device 120a, a module 130a for detecting at least one maintenance operation on the aircraft and computer devices $140_1$ to $140_N$ referred to, on FIG. 1a, as computers.

The computer devices $140_1$ to $140_N$ are, during their data updating, liable or not to affect the safety of an operator performing maintenance on the aircraft.

Each computer device $140_1$ to $140_N$ is connected to the data router 110a by means of links of the ARINC 429, ISO/IEC 802-3 Ethernet, Ethernet, ARINC 664 or CAN type or equivalent. More precisely, each computer device $140_1$ to $140_N$ is connected to the data router by two links, one link for transferring data and one link for enabling the updating of this computer.

The data router 110a is connected to the data loading device 100a by means of a link of the ARINC 429, Ethernet, ISO/IEC 802-3, ARINC 664 or CAN type or equivalent. More precisely, the data loading device 100a is connected to the data source by two links, one link for transferring data and one link for transferring information for configuring the data router.

The communication device 120a comprises means for communicating with the outside of the aircraft, for example with a control device 180 for transferring updating data. The communication device 120 receives commands for updating the data of a computer device 140 and in response controls the data loading device for loading data obtained from the control device 180 for transferring updating data and controls the data router 110a so that the latter directs the data received from the data loading device 100a to the computer device for which the data are intended.

Thus the communication device 120a must control two devices for the updating to be able to be performed.

The communication device 120a is connected to the data router 110a and to the data loading device by means of links of the ARINC 429, ISO/IEC 802-3 Ethernet, Ethernet, ARINC 664 or CAN type or equivalent.

According to the invention, the system further comprises a module 130a for detecting at least one maintenance operation on the aircraft. The module 130a for detecting at least one maintenance operation on the aircraft comprises at least one input Mt1 that delivers an active signal for indicating that a maintenance operation is being performed on the aircraft. The active signal is for example a pressing done by a maintenance operator on a button or a message received from a communication device used by the operator. For example, other signals such as signals delivered by door-opening sensors or sensors for the functioning of propulsion members of the aircraft may deliver an active signal that indicates that the aircraft is not in a maintenance situation.

According to the invention, when at least one signal is active, the module 130a for detecting at least one maintenance operation on the aircraft demands the blocking of the data for updating the computer device.

The system comprises a weight-detection device on at least one wheel of the aircraft (WoW, standing for "weight on wheels", i.e. the "on the ground" position of the aircraft) that is connected by means of the data loading device 100a and the module 130a for detecting at least one maintenance operation on the aircraft to the data router 110a. When a weight is detected on a wheel, the data router 100a cannot route updating data to a computer device, the module 130a for detecting at least one maintenance operation on the aircraft blocking the updating of the data.

The module 130a for detecting at least one maintenance operation on the aircraft is connected to the data loading device 100a and to the data router by means of links of the ARINC 429, ISO/IEC 802-3 Ethernet, Ethernet, ARINC 664 or CAN type or equivalent.

Figure 1B:
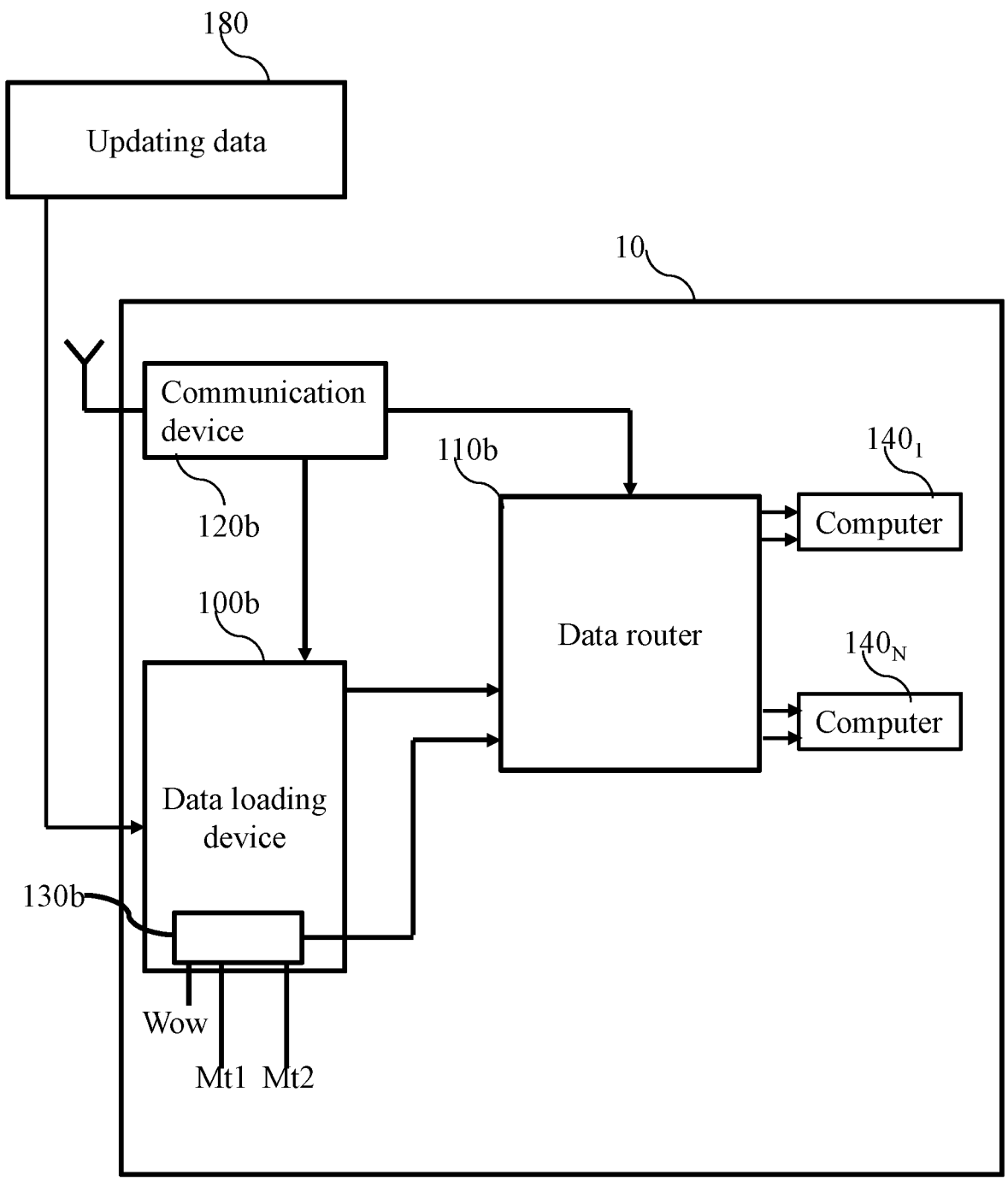
FIG. 1b shows a second example of architecture of the data updating system for computer devices included in an aircraft.

FIG. 1b shows a second example of architecture of the data updating system for computer devices included in an aircraft.

In FIG. 1b, an aircraft 10 comprises a data updating system for computer devices $140_1$ to $140_N$ included in the aircraft 10.

The data updating system comprises a data loading device 100b, a data router 110b, a communication device 120b, a module 130b for detecting at least one maintenance operation on the aircraft and computer devices $140_1$ to $140_N$ referred to, on FIG. 1b, as computers.

The architecture of the system of FIG. 1b is identical to the one described with reference to FIG. 1a apart from the fact that the module 130b for detecting at least one maintenance operation on the aircraft is included in the data loading device 100b.

Figure 1C:
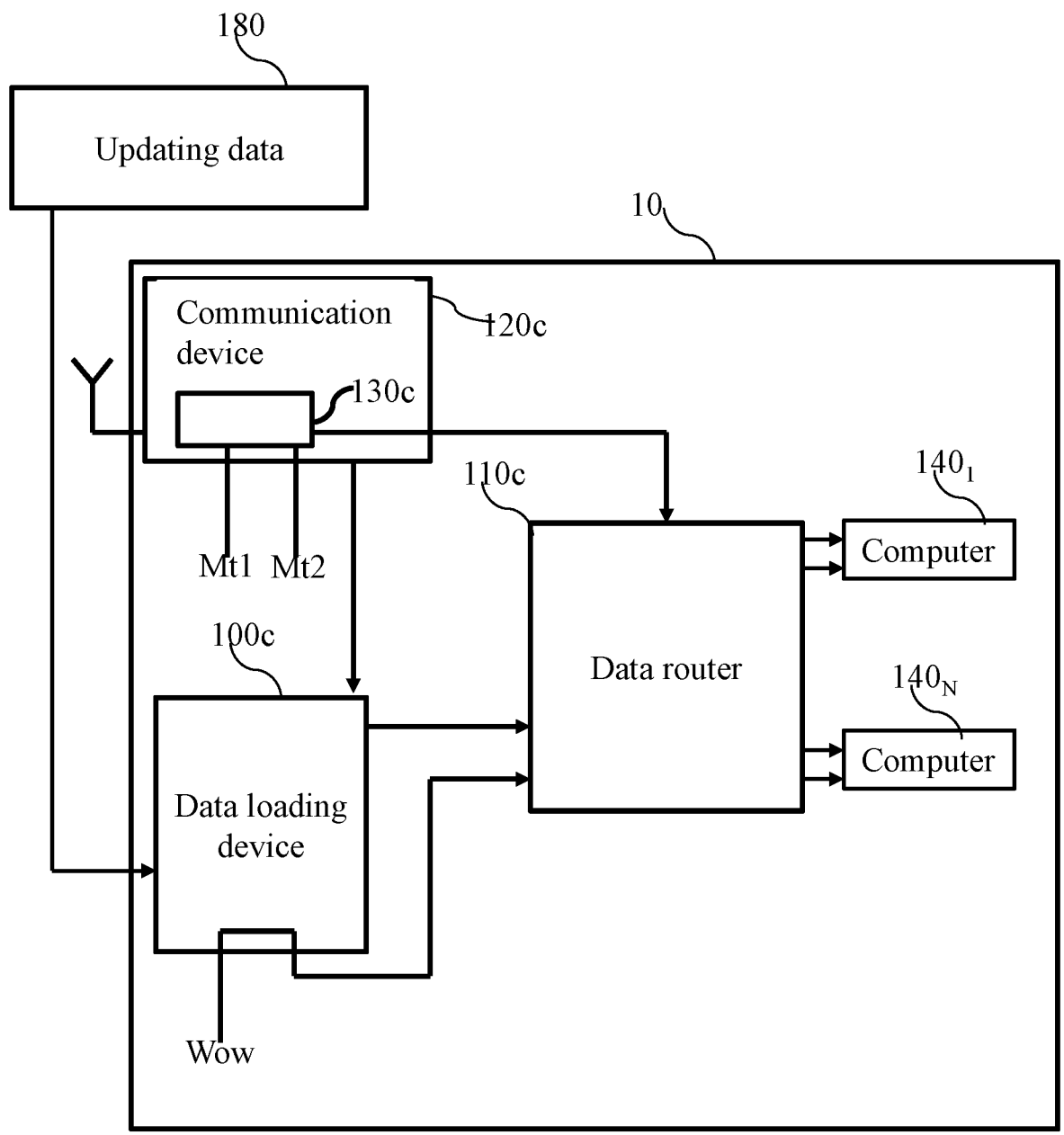
FIG. 1c shows a third example of architecture of the data updating system for computer devices included in an aircraft.

FIG. 1c shows a third example of architecture of the data updating system for computer devices included in an aircraft.

In FIG. 1c, an aircraft 10 comprises a data updating system for computer devices $140_1$ to $140_N$ included in the aircraft 10.

The data updating system comprises a data loading device 100c, a data router 110c, a communication device 120c, a module 130c for detecting at least one maintenance operation on the aircraft and computer devices $140_1$ to $140_N$ referred to on FIG. 1a as computers. The devices are connected together by means of links of the ARINC 429, ISO/IEC 802-3 Ethernet, Ethernet, ARINC 664 or CAN type or equivalent.

The computer devices $140_1$ to $140_N$ are, when the data thereof are updated, liable or not to affect the safety of an operator performing maintenance on the aircraft.

The communication device 120a comprises means for communicating with the outside of the aircraft, for example with a control device 180 for transferring updating data. The communication device 120 receives commands for updating the data of a computer device 140.

In the example in FIG. 1c, the communication device 120 further comprises a module 130c for detecting at least one maintenance operation on the aircraft. The module 130c for detecting at least one maintenance operation on the aircraft comprises at least one input Mt1 that delivers an active signal for indicating that a maintenance operation is being performed on the aircraft. The active signal is for example a pressing done by a maintenance operator on a button or a message received from a communication device used by the operator. For example, signals other than signals delivered by door-opening sensors or sensors for the functioning of the propulsion members of the aircraft may deliver an active signal. When at least one signal is active, the module 130c for detecting at least one maintenance operation on the aircraft demands the blocking of the commands of the data loading device for a loading of data obtained from the control device 180 and of the transfer of updating data and blocks the commands to the data router 110c.

The system comprises a weight detection device on at least one wheel of the aircraft (WoW, standing for "weight on wheels", i.e. the "on the ground" position of the aircraft) that is connected by means of the data loading device 100c to the data router 110c. When the aircraft is in flight, i.e. no weight is detected on a wheel, the data router 100c cannot route updating data to a computer device.

Figure 1D:
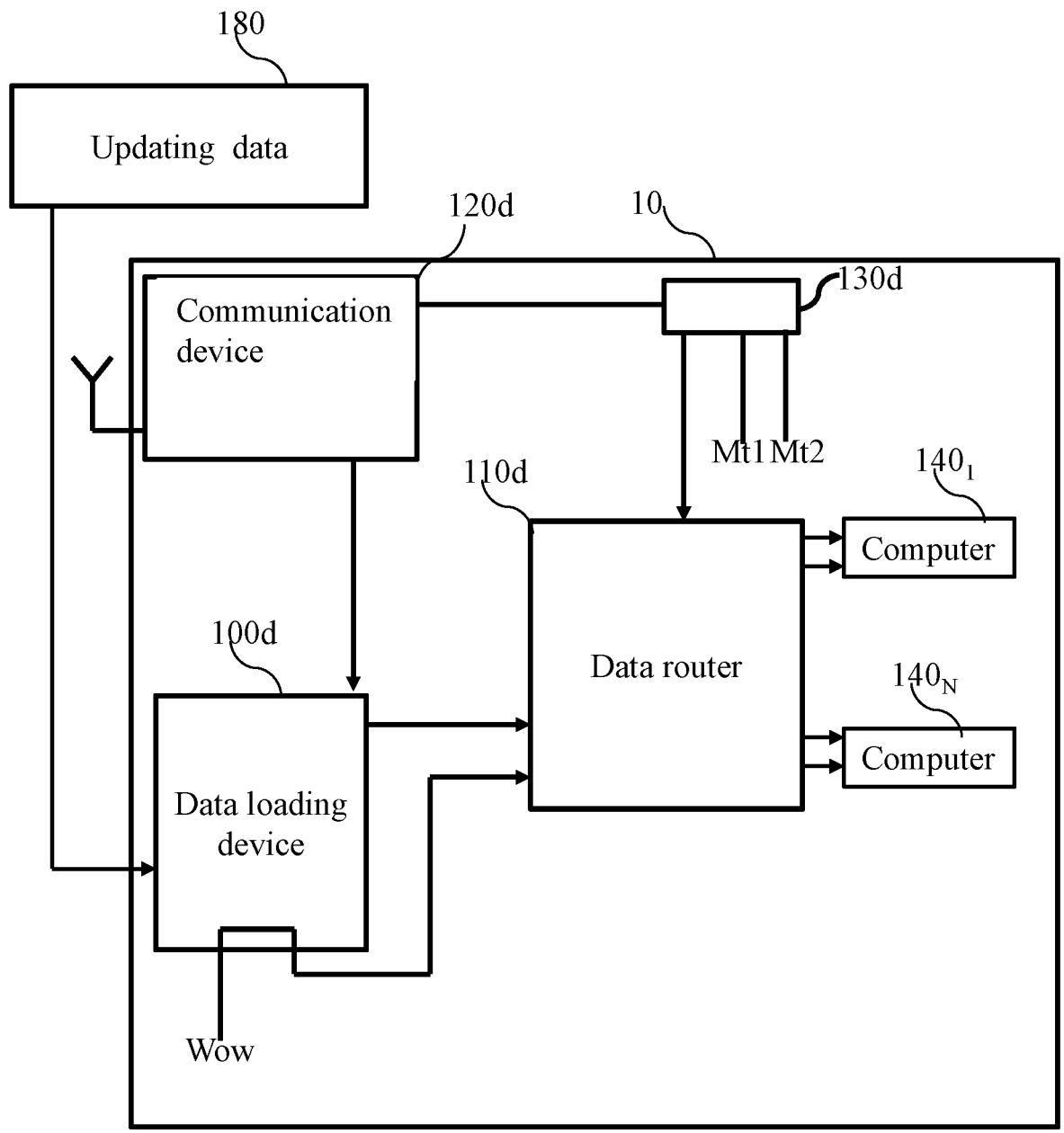
FIG. 1d shows a fourth example of architecture of the data updating system for computer devices included in an aircraft.

FIG. 1d shows a fourth example of architecture of the data updating system for computer devices included in an aircraft.

In FIG. 1d, an aircraft 10 comprises a data updating system for computer devices $140_1$ to $140_N$ included in the aircraft 10.

The data updating system comprises a data loading device 100d, a data router 110d, a communication device 120d, a module 130d for detecting at least one maintenance operation on the aircraft and computer devices $140_1$ to $140_N$ referred to, on FIG. 1d, as computers. The devices are connected together by means of links of the ARINC 429, ISO/IEC 802-3 Ethernet, Ethernet, ARINC 664 or CAN type or equivalent.

More precisely, the data router is connected to each computer device $140_1$ to $140_N$ and to the data loading device by two links, one link for transferring data and one link for enabling the updating of the computer device.

The computer devices $140_1$ to $140_N$ are, when the data thereof are updated, liable or not to affect the safety of an operator performing maintenance on the aircraft.

The communication device 120d comprises means for communicating with the outside of the aircraft, for example with a control device 180 for transferring updating data. The communication device 120 receives commands for updating the data of a computer device 140.

In the example in FIG. 1d, the communication device 120 is connected to the data router by means of a module 130d for detecting at least one maintenance operation on the aircraft. The module 130d for detecting at least one maintenance operation on the aircraft comprises at least one input Mt1 that delivers an active signal for indicating that a maintenance operation is being performed on the aircraft. The active signal is for example a pressing done by a maintenance operator on a button or a message received from a communication device used by the operator. For example, signals other than signals delivered by door-opening sensors or sensors for the functioning of propulsion members of the aircraft may deliver an active signal. When at least one signal is active, the module 130d for detecting at least one maintenance operation on the aircraft demands the blocking of commands to the data router 110d.

The system comprises a device for detecting weight on at least one wheel of the aircraft (WoW, standing for "weight on wheels", i.e. the "on the ground" position of the aircraft, which is connected by means of the data loading device 100d to the data router 110d. When the aircraft is in flight, i.e. no weight is detected on a wheel, the data router 100d cannot route updating data to a computer device.

Figure 1E:
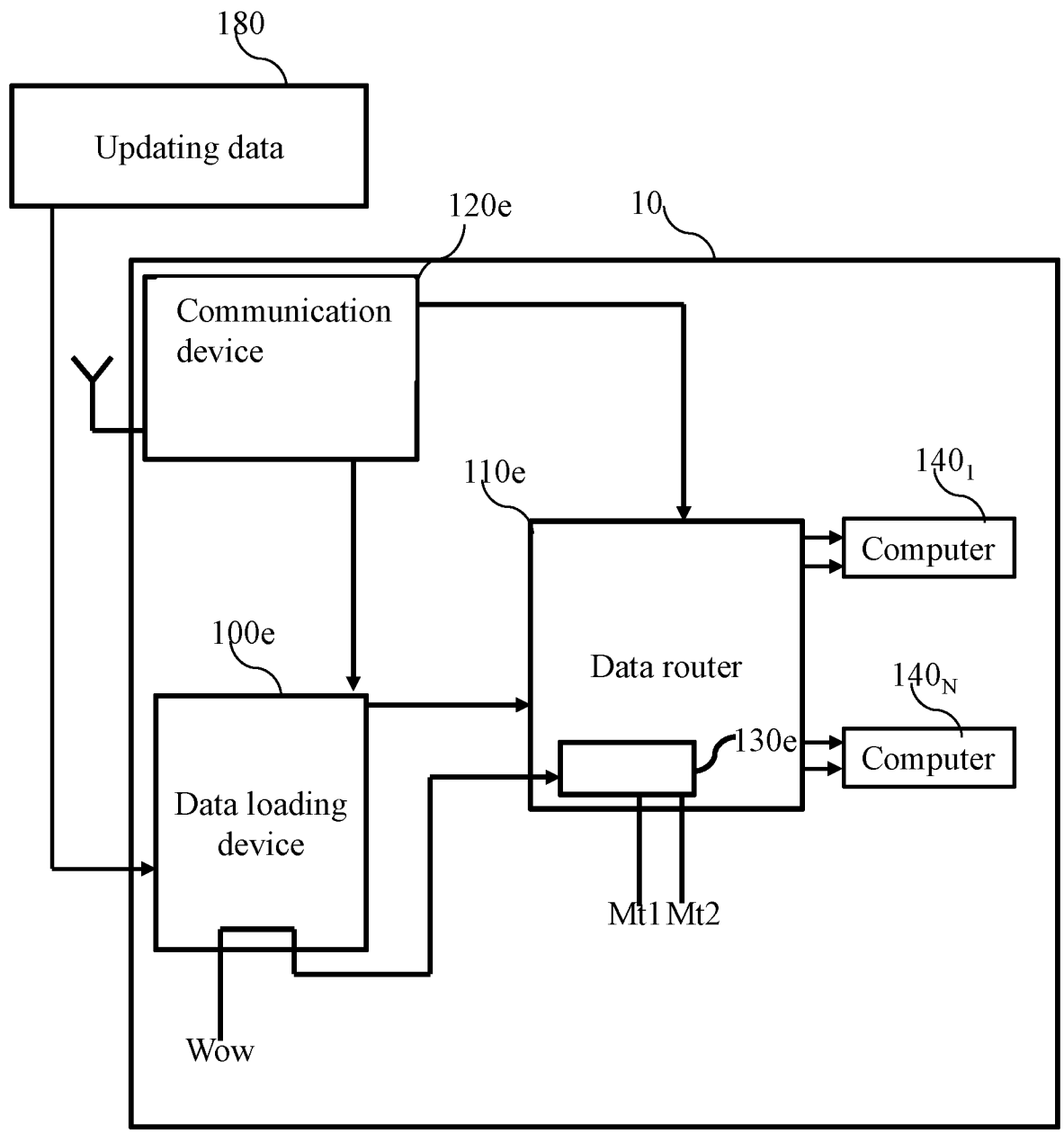
FIG. 1e shows a fifth example of architecture of the data updating system for computer devices included in an aircraft.

FIG. 1e shows a fifth example of architecture of the data updating system for computer devices included in an aircraft.

In FIG. 1e, the aircraft 10 comprises a data updating system for computer devices $140_1$ to $140_N$ included in the aircraft 10.

The data updating device comprises a data loading device 100e, a data router 110e, a communication device 120e, a module 130e for detecting at least one maintenance operation on the aircraft and computer devices $140_1$ to $140_N$ referred to, on FIG. 1e, as computers.

The computer devices $140_1$ to $140_N$ are, when the data thereof are updated, liable or not to affect the safety of an operator performing maintenance on the aircraft.

The devices of the system are connected by means of links of the ARINC 429, ISO/IEC 802-3 Ethernet, Ethernet, ARINC 664 or CAN type or equivalent.

More precisely, the data router is connected to each computer device $140_1$ to $140_N$ and to the data loading device by two links, one link for transferring data and one link for enabling the updating of the computer device.

The communication device 120e is identical to the communication device 120a, the data loading device 120e is identical to the data loading device 120e.

In the example in FIG. 1e, the module 130e for detecting at least one maintenance operation on the aircraft is identical to the module 130a for detecting at least one maintenance operation on the aircraft but is included in the data router 110e.

The module 130a for detecting at least one maintenance operation on the aircraft comprises at least one input Mt1 that delivers an active signal for indicating that a maintenance operation is being performed on the aircraft. The active signal is for example a pressing done by a maintenance operator on a button or a message received from a communication device used by the operator. For example, signals other than signals delivered by door-opening sensors or sensors for the functioning of propulsion members of the aircraft may deliver an active signal.

According to the invention, when at least one signal is active, the module 130e for detecting at least one maintenance operation on the aircraft demands the blocking of the data for updating the computer device.

Figure 2:
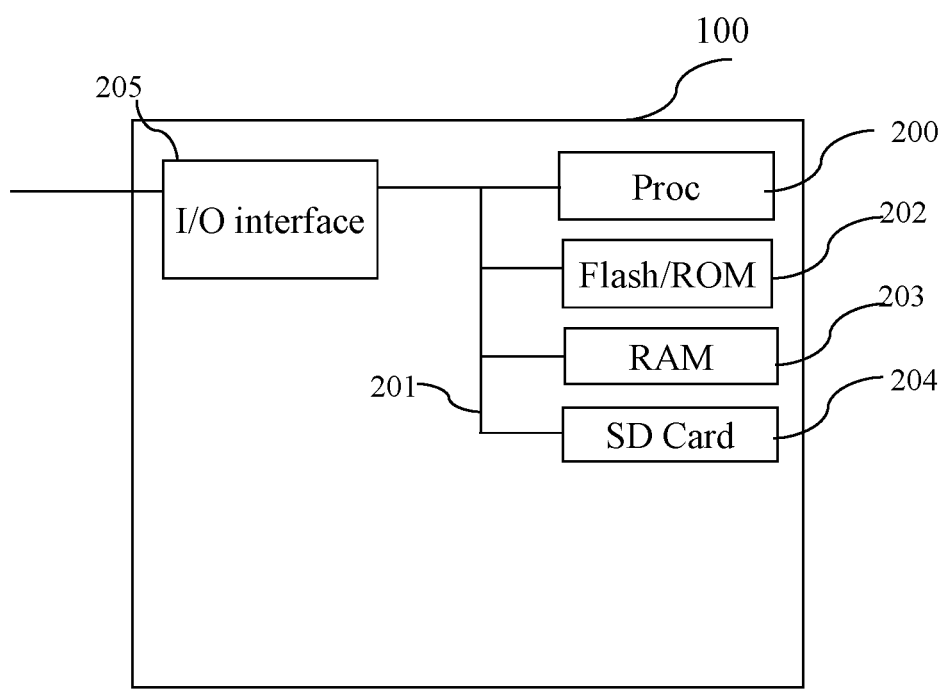
FIG. 2 shows an example of architecture of a module for detecting at least one maintenance operation on the aircraft wherein the present invention is implemented.

FIG. 2 shows an example of architecture of the module for detecting at least one maintenance operation on the aircraft wherein the present invention is implemented.

The module 130a to 130e for detecting at least one maintenance operation on the aircraft comprises:
- a processor, microprocessor or microcontroller 200;
- a volatile memory 203;
- a non-volatile memory 202;
- optionally, a storage medium reader 204, such as an SD card (Secure Digital card) reader or a hard disk;
- an input/output interface I/O 205 receiving at least one active signal and blocking or not the transfer of the updating data;
- a communication bus 201 connecting the processor 200 to the ROM memory 202, to the RAM memory 203, to the storage medium reader 204 and to the interface 205.

The processor 200 is capable of implementing instructions loaded in the volatile memory 203 from the non-volatile memory 202, from an external memory (not shown), from a storage medium, such as an SD card or the like, or from a communication network. When the module 130a to 130e for detecting at least one maintenance operation on the aircraft is powered up, the processor 200 is capable of reading instructions from the volatile memory 203 and implementing them. These instructions form a computer program that causes the implementation, by the processor 200, of all or part of the method described in relation to FIG. 3.

Figure 3:
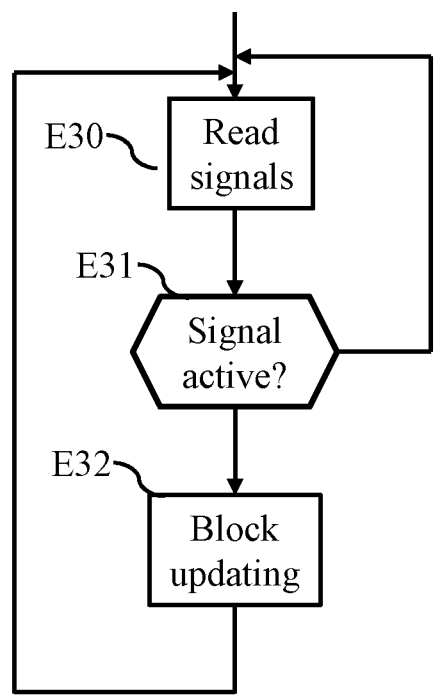
FIG. 3 shows an example of an algorithm executed by the module for detecting at least one maintenance operation on the aircraft according to the present invention.

All or part of the method described in relation to FIG. 3 can be implemented in software form by implementing a set of instructions by a programmable machine such as a DSP (digital signal processor) or a microcontroller or be implemented in hardware form by a machine or a dedicated component such as an FPGA (field-programmable gate array) or an ASIC (application-specific integrated circuit). The method could also be implemented by simple electronic components, such as relays, discrete logic gates, or the equivalent.

FIG. 3 shows an example of an algorithm executed by the module for detecting at least one maintenance operation on the aircraft according to the present invention.

At the step E30 the module for detecting at least one maintenance operation on the aircraft reads the state of the input signals present on its input/output interface 205.

At the following step E31, the module for detecting at least one maintenance operation on the aircraft checks whether at least one signal is active.

If so, the module for detecting at least one maintenance operation on the aircraft passes to the step E32. If not, the module for detecting at least one maintenance operation on the aircraft returns to the step E30.

At the step E32, the module for detecting at least one maintenance operation on the aircraft blocks the data for updating the computer device or at least one command for transferring the updating data.

The invention claimed is:

1. A data updating system for computer devices included in an aircraft, the computer devices being, when the data of the computer device are updated, liable or not to affect the safety of an operator carrying out maintenance, wherein the system is included in the aircraft and comprises:
   a data loading device,
   a communication device,
   a data router,
   a module for detecting at least one maintenance operation on the aircraft, the data router being connected to the data loading device, the communication device being configured for receiving commands from a device located outside the aircraft, and
   circuitry causing the system to perform:
      receiving, by the communication device, a command for updating a computer device,
      controlling, by the communication device, the data loading device for transferring data for updating the computer device to the data router in response to the command for updating the computer device being received,
      controlling, by the communication device, the data router for transferring the updating data to the computer device in response to the command for updating the computer device being received,
      detecting that at least one signal indicating that a maintenance operation is being performed on the aircraft is received by the module for detecting at least one maintenance operation, and
      blocking, by the module for detecting at least one maintenance operation on the aircraft, the data for updating the computer device or at least one command for transferring the updating data in response to detecting that at least one signal indicating that the maintenance operation is being performed on the aircraft is received by the module for detecting at least one maintenance operation.

2. The system according to claim 1, wherein the module for detecting at least one maintenance operation on the aircraft is included in the communication device and the blocking blocks the commands of the data loading device and the commands of the data router.

3. The system according to claim 1, wherein the module for detecting at least one maintenance operation on the aircraft is included in the data loading device and the blocking blocks the transfer of the data for updating the computer device to the data router.

4. The system according to claim 1, wherein the module for detecting at least one maintenance operation on the aircraft is included in the data router and the blocking blocks the transfer of the updating data to the computer device.

5. The system according to claim 1, wherein the module for detecting at least one maintenance operation on the aircraft is included between the communication device and the data router and the blocking blocks the commands of the data router.

6. The system according to claim 1, further comprising a device for detecting weight on at least one wheel of the aircraft and the device for detecting weight device blocks the data for updating the computer device or blocks at least one command for transferring the updating data.

7. The system according to claim 1, wherein the module for detecting at least one maintenance operation on the aircraft comprises circuitry causing the module for detecting at least one maintenance operation on the aircraft to detect a command generated by a maintenance operator.

8. The system according to claim 1, wherein the module for detecting at least one maintenance operation on the aircraft comprises circuitry causing the module for detecting at least one maintenance operation on the aircraft to detect a condition that the aircraft is not in a maintenance phase, and the updating operation is not enabled.

9. The system according to claim 1, wherein the updating data are received by means of a link with a data device for transferring updating data located outside the aircraft.

10. A method for updating data for computer devices included in an aircraft, the computer devices being, during the updating of the data of the computer device, liable or not to affect the safety of an operator performing maintenance, wherein the aircraft comprises a data loading device, a communication device, a data router and a module for detecting at least one maintenance operation on the aircraft, the data router being connected to the data loading device, the communication device being configured for receiving commands from a device located outside the aircraft, and wherein the method comprises:

receiving, by the communication device, a command for updating a computer device, controlling, by the communication device, the data loading device for transferring data for updating the computer device to the data router in response to the command for updating the computer device being received, controlling, by the communication device, the data router for transferring the updating data to the computer device in response to the command for updating the computer device being received, detecting that at least one signal indicating that a maintenance operation is being performed on the aircraft is received by the module for detecting at least one maintenance operation, and blocking, by the module for detecting at least one maintenance operation on the aircraft, the data for updating the computer device, or blocking at least one command for transferring the updating data in response to detecting that the at least one signal indicating that the maintenance operation is being performed on the aircraft is received by the module for detecting at least one maintenance operation.

11. A non-transitory storage medium that stores a computer program comprising instructions for implementing the method according to claim 10 when said program is executed by a processor.

* * * * *